(12) United States Patent
Sigafoes

(10) Patent No.: US 6,615,890 B1
(45) Date of Patent: Sep. 9, 2003

(54) TAPE APPLICATOR FOR GLAZING APPLICATIONS

(75) Inventor: Robert T. Sigafoes, Blairsville, PA (US)

(73) Assignee: Venture Tape Corp., Rockland, MA (US)

( * ) Notice: Subject to any disclaimer, the term of this patent is extended or adjusted under 35 U.S.C. 154(b) by 0 days.

(21) Appl. No.: 09/591,681

(22) Filed: Jun. 9, 2000

(51) Int. Cl.$^7$ .............................................. B32B 31/00
(52) U.S. Cl. ...................... 156/355; 156/351; 156/522; 156/269
(58) Field of Search ................................ 156/522, 355, 156/106, 107, 105, 475, 200, 270, 271, 250, 297, 212, 256, 351, 269

(56) References Cited

U.S. PATENT DOCUMENTS

| | | | |
|---|---|---|---|
| 2,776,068 A | * 1/1957 | Johnson | 156/351 |
| 3,473,988 A | * 10/1969 | Rullier et al. | 156/107 |
| 3,655,479 A | * 4/1972 | Helmes et al. | 156/212 |
| 3,674,590 A | * 7/1972 | Holman | 156/252 |
| 3,725,182 A | 4/1973 | Regan | 156/527 |
| 3,767,511 A | * 10/1973 | Slade | 156/499 |
| 3,819,448 A | * 6/1974 | Beever, III | 156/355 |
| 3,892,618 A | 7/1975 | Griebat | 156/355 |
| 3,968,001 A | 7/1976 | Lockwood | 156/523 |
| 4,060,444 A | 11/1977 | Schweig, Jr. et al. | 156/391 |
| 4,080,239 A | 3/1978 | Real et al. | 156/361 |
| 4,230,519 A | 10/1980 | DuBroff | 156/468 |
| 4,285,752 A | 8/1981 | Higgins | 156/520 |
| 4,345,966 A | 8/1982 | Iiyama et al. | 156/523 |
| 4,396,455 A | 8/1983 | Uchida | 156/577 |
| 4,419,172 A | 12/1983 | Bopst, III | 156/576 |
| 4,455,188 A | 6/1984 | Stormby | 156/355 |
| 4,592,188 A | 6/1986 | Marchetti | 53/137 |
| 4,612,078 A | 9/1986 | Karp | 156/493 |
| 4,623,421 A | 11/1986 | Cardin | 156/523 |
| 4,636,276 A | 1/1987 | Nozaka | 53/136.4 |
| 4,714,504 A | * 12/1987 | Cummings et al. | 156/64 |
| 4,732,644 A | 3/1988 | Chiu | 156/468 |
| 4,758,291 A | 7/1988 | Fechner et al. | 156/71 |
| 4,851,074 A | 7/1989 | Hiromichi | 156/541 |
| 4,880,490 A | 11/1989 | MacIntyre | 156/541 |
| 4,936,941 A | 6/1990 | Williams et al. | 156/353 |
| 4,980,011 A | 12/1990 | Gruber et al. | 156/361 |
| 4,990,213 A | 2/1991 | Brown et al. | 156/42.5 |
| 5,045,146 A | 9/1991 | Rundo | 156/391 |
| 5,052,165 A | 10/1991 | Gunther | 156/413 |
| 5,053,099 A | * 10/1991 | Seki et al. | 156/250 |
| 5,069,739 A | 12/1991 | Kautt | 156/468 |
| 5,110,391 A | 5/1992 | Taguchi et al. | 156/250 |
| 5,312,501 A | 5/1994 | Gruber et al. | 156/238 |
| 5,354,410 A | 10/1994 | Cohen et al. | 156/522 |
| 5,380,395 A | 1/1995 | Uchida | 156/577 |
| 5,536,342 A | * 7/1996 | Reis et al. | 156/64 |
| 5,580,413 A | 12/1996 | Assink et al. | 156/361 |
| 5,628,867 A | 5/1997 | Renaud | 156/574 |
| 5,640,830 A | 6/1997 | Jabalee et al. | 156/397 |
| 5,647,111 A | 7/1997 | Zienkiewicz et al. | 29/34 B |

* cited by examiner

Primary Examiner—Linda Gray
(74) Attorney, Agent, or Firm—Wolf, Greenfield & Sacks, P.C.

(57) ABSTRACT

A tape applicator for application of a double-sided adhesive tape to a member which can be cut and assembled to form a frame or sash for glazing for a skylight, a window or a door, or which can be used to form a muntin. The tape applicator includes a drive roller for advancing members sequentially through the apparatus. The tape applicator also includes a pressure roller for urging the tape onto the member, and for urging the member into engagement with the drive roller. A guide roller guides the location of the tape to the member so that it is applied to the proper location. A cutting mechanism is automatically actuated for cutting the tape adjacent the trailing end of each member at a desired location. The cutting mechanism is actuated by a switch which is engaged by the member.

14 Claims, 3 Drawing Sheets

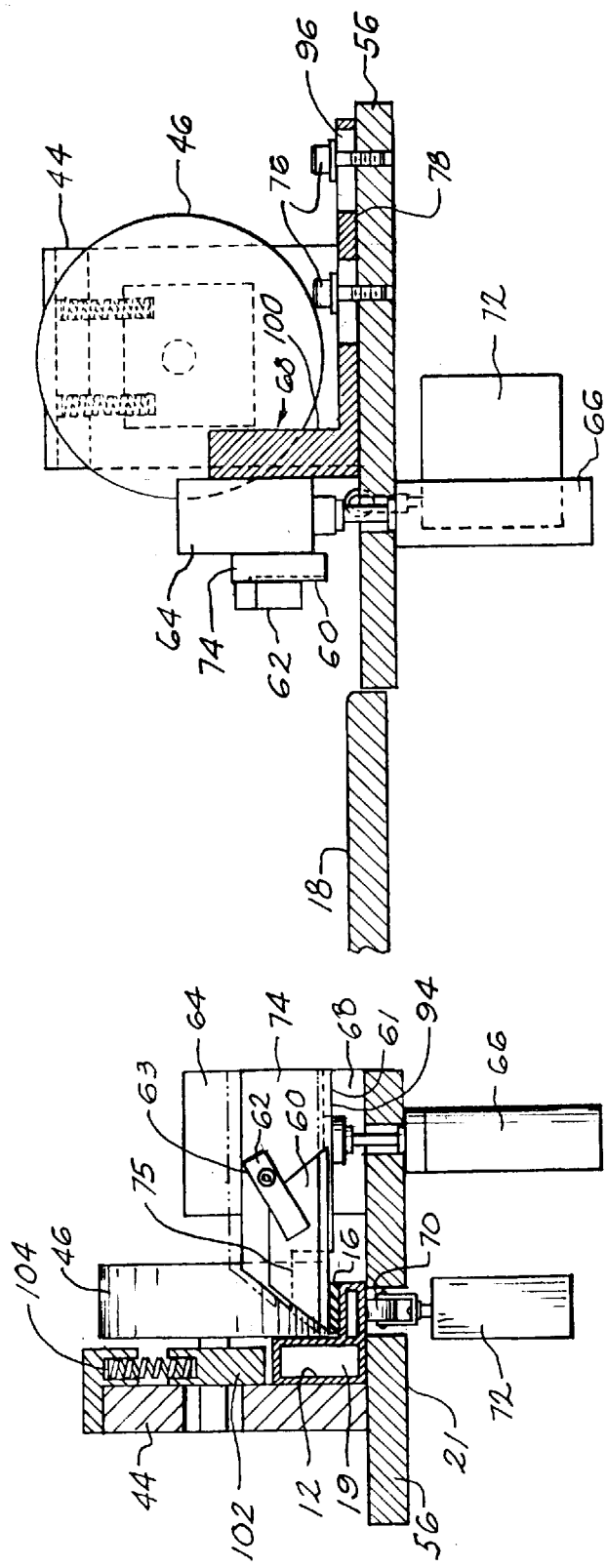
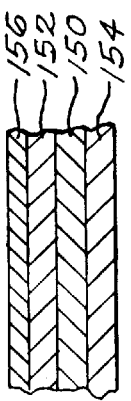
FIG. 4
FIG. 1A
FIG. 3

TAPE APPLICATOR FOR GLAZING APPLICATIONS

FIELD OF THE INVENTION

This invention relates generally to adhesive tape applicators, and more particularly to applicators for applying tape to the components of a frame or a sash for glazing and to the bars of a muntin.

BACKGROUND OF THE INVENTION

In conventional windows, doors, skylights and the like, glazing tape is commonly used to seal and secure the glazing to the frame or sash into which it is installed. The tape typically includes a high tack adhesive disposed on both sides of a foam carrier, and a release liner that covers the adhesive on one side of the tape. The release liner remains in place until installation of the glass, at which time it is removed. The side of the tape without the release liner is secured to a glazing leg on the frame or sash member. The side with the release liner faces away from the glazing leg and is exposed. When glazing, the release liner is removed from the tape and the glass is secured to the glazing tape on the glazing leg.

The use of such glazing tapes permits rapid assembly of doors, windows and skylights and provides a low-cost, secure seal. Such glazing tapes are particularly commonly used with frames or sashes formed of an extruded plastic or vinyl, although these tapes can also be used with aluminum frames, wooden frames and the like. A typical glazing tape used for such applications can be obtained from Venture Tape Corp. under the product designations VG100 series and VG300 series (Venture glazing tape). Such tapes typically are provided on a roll having a central cardboard core about which the tape is wound, and are available in any desired width in the range from about ¼" to about 3".

Colonial-style or divided lite windows and doors are a very popular feature in the domestic housing market. However, manufacture of such windows and doors is very labor intensive and consumes large amounts of energy, because of the many individual pieces of glass that must be separately mounted into the door frame, window frame or sash. To reduce energy and labor costs, manufacturers have developed different techniques to provide the appearance of a divided lite or colonial-style window or door. One recent development, and one that is the most realistic-looking, is the use of a window or door grill or muntin which is affixed to the exterior or interior of a glass pane, or insulated glass unit. This grill or muntin provides the appearance of a colonial or divided lite window or door when in fact the window or door actually comprises a single glass unit. Such grills or muntins are inexpensively made and affixed to the outer or inner surface of a window or door.

Each individual component of a muntin is referred to as a bar. The muntin bars may be formed of wood, vinyl, aluminum or the like. These muntin bars are cut to the appropriate size and shape, and then are affixed to one another to form the desired window style, such as a colonial or divided lite-style window. The technique most commonly used to affix a muntin to the window is a double-sided adhesive tape, similar to the glazing tape used to secure glazing to its frame or sash. The tape used for muntin applications typically includes a high tack adhesive on both sides of a carrier, and a release liner that covers the adhesive on one side of the tape. The side of the tape without the release liner is secured to the surface of the muntin bars, usually during assembly, and the side with the release liner faces away from the muntin bars and is exposed. The release liner remains in place until installation of the muntin, at which time it is removed from the muntin bars for affixation of the muntin to the glass. The use of such adhesive tapes permits rapid assembly of windows and doors.

A prior art apparatus for applying tape is disclosed in U.S. Pat. No. 5,354,410, assigned to the assignee of the present application. This apparatus is not automated, and can handle only one member at a time.

SUMMARY OF THE INVENTION

The present invention represents an improvement over prior art apparatus and provides a substantially fully automated tape applicator for the members of a frame or sash for glazing and for muntin bars. The frame members, sash members, or muntin bars (hereinafter members) are advanced through the apparatus, tape is applied to each member, and the tape is cut automatically adjacent the end of each member without any manual intervention.

In one aspect of this invention, a feed mechanism, such as a drive roller, advances the members sequentially through the apparatus. Each member is pushed by members immediately thereafter. Tape is dispensed onto the members and a first pressure roller urges the tape against the members to firmly apply the tape. Guide mechanisms guide the members through the apparatus and a cutter cuts the tape adjacent a trailing edge of each member. In another aspect, the tape is dispensed from a roll upstream of the drive roller and the first pressure roller and is guided to the member by a tape guide roller. In another aspect, the first pressure roller urges the members against the drive roller to propel them through the apparatus.

In yet another aspect of the invention, a tape cutting mechanism cuts the tape automatically adjacent the trailing end of each member as the member passes through the apparatus. As the trailing end of each member reaches a predetermined location, a cutting blade is automatically actuated for cutting the tape.

In a preferred embodiment, the tape cutting mechanism of this invention includes a switch and an arm extending from the switch that projects through an opening in the table downstream of the drive roller. The tip of the arm preferably is provided with a roller, the top edge of which extends slightly above the top surface of the table. The top surface of the table in the vicinity of the switch is recessed slightly below the top surface of the table upstream of the switch adjacent to the drive roller. Downstream of the switch is a second pressure roller which urges the member against the top surface of the table. As the member passes from the elevated section of the table adjacent the drive roller, to the recessed section of the table adjacent the switch, the member is spaced slightly above the top surface of the table, and does not engage the roller on the switch arm. As the member continues its advancement, the forward end is urged downwardly against the top surface of the recessed section of the table by the second pressure roller. Initially, the trailing edge of the member rests on the elevated section of the table upstream of the switch, so that the member is disposed at an angle, and is spaced above the roller of the switch arm. As the frame member is advanced farther, the trailing edge eventually drops onto the recessed table section. At this point, the switch arm is pushed downwardly, activating the switch. A signal from the switch causes the apparatus to temporarily stop advancement of the member, and actuates the cutting blade, which drops onto the member and cuts the tape adjacent the trailing end of the member. The blade is then raised. The cutting blade preferably is operated by a pneumatic cylinder or the like. A timer resets the apparatus, allowing the apparatus to continue its operation.

In yet another further aspect of the invention, the position of the cutting mechanism is adjustable with respect to the feed direction to permit the cutting blade to be positioned to cut the tape at the desired location with respect to the trailing edge of a member.

In yet another further aspect of the invention, multiple rollers are provided for guiding the member to and past the first pressure roller, and the cutting mechanism.

In the method of this invention, members are advanced sequentially through an apparatus in a feed direction. Tape is fed to each member and is urged against each member to form an adhesive bond. The tape is then automatically cut adjacent a trailing edge of each member. In one aspect of the method of this invention, advancement of the members is temporarily stopped while the tape is being cut. In another aspect of the method, a single drive roller advances each of the members.

BRIEF DESCRIPTION OF THE DRAWINGS

The objects, advantages and features of this invention will be more clearly appreciated from the following detailed description, when taken in conjunction with the accompanying drawings, in which:

FIG. 1A is a partial cross-section of the detail 1A of FIG. 1;

FIG. 3 is a cross-sectional, end view of the tape applicator apparatus of FIG. 1, taken along the line 3—3 of FIG. 2; and FIG. 4 is a partial, cross-sectional side view of the tape applicator apparatus of FIG. 1, taken along the line 4—4 of FIG. 2.

DETAILED DESCRIPTION

Figure 1:
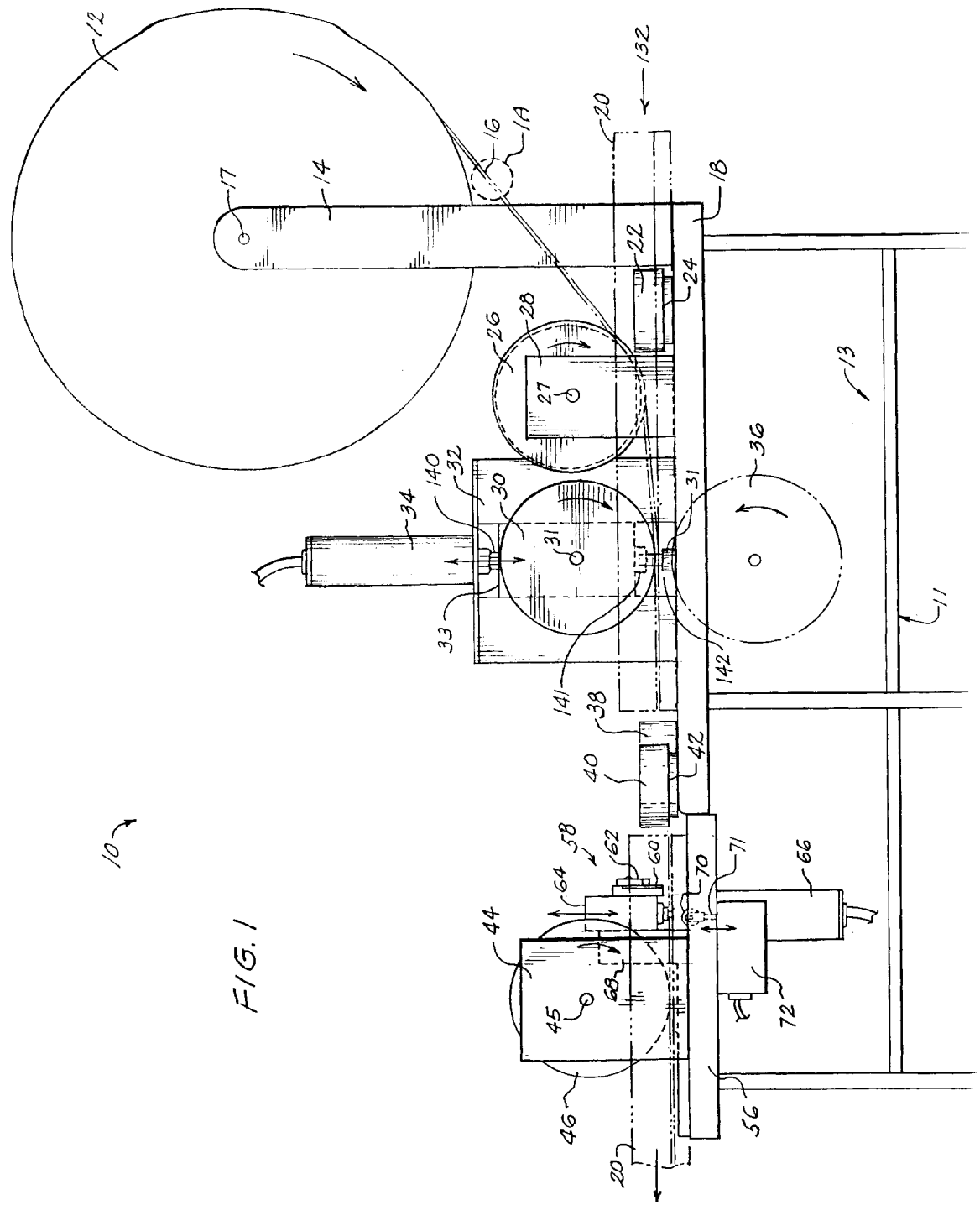
FIG. 1 is a side, elevation view of the tape applicator apparatus of this invention.

Tape applicator 10 of this invention is designed to apply a glazing tape 16 to a member 20 which is a component of a frame or sash for glazing for conventional windows, doors, skylights and the like, or which is a muntin bar used to assemble a muntin. A typical member 20 is formed of a plastic or vinyl extrusion, aluminum, wood or other like materials. As is most clearly illustrated in FIG. 3, in which member 20 is a sash member for glazing and is shown in cross-section, member 20 includes a structural segment 19 and a glazing leg 21. Segment 19 provides structural strength to the member 20, while glazing leg 21 is the portion of member 20 upon which the glazing seats. If member 20 is a muntin bar, there is no glazing leg and the tape is directly applied to an outer surface of the muntin bar.

Since this invention has applicability to frame members for glazing, to sash members for glazing, and to muntin bars which are to be assembled to form a muntin bar for attachment to either the interior or exterior surface of glass, the term "members" as used in this application is defined to include at least frame members which are used to form a frame for glazing, sash members which are used to form a sash, muntin bars which are used to form a muntin, and all other similar structures. For purposes of illustration only, the tape applicator of this invention will be described throughout this application primarily in conjunction with the embodiment in which tape is applied to members of a sash for glazing. However, it will be appreciated that in every instance when a sash member for glazing is described in conjunction with this invention, the description applies equally to muntin bars and to frame members.

Tape 16, as shown in cross-section in FIG. 1A, includes a carrier 150 having high tack adhesive layers 152 and 154 disposed on opposite sides thereof. A release liner 156 covers the adhesive layer 152 on one side, permitting tape 16 to be provided on roll 12 without the adhesive sticking to itself. When tape 16 is applied, adhesive layer 154 is affixed to glazing leg 21 (or to an outer surface of a muntin bar) and release liner 156 and adhesive layer 152 of the tape face upwardly away from glazing leg 21 or the muntin bar. When the tape is adhesively bonded to glazing leg 21 or a muntin bar, the release liner 156 covers adhesive layer 152 to protect layer 152 until installation. During installation, release liner 156 is removed, and the glazing is bonded directly to adhesive layer 152. A suitable tape 16 is sold by Venture Tape Corp. under the product designations VG100 series and VG300 series.

Figure 2:
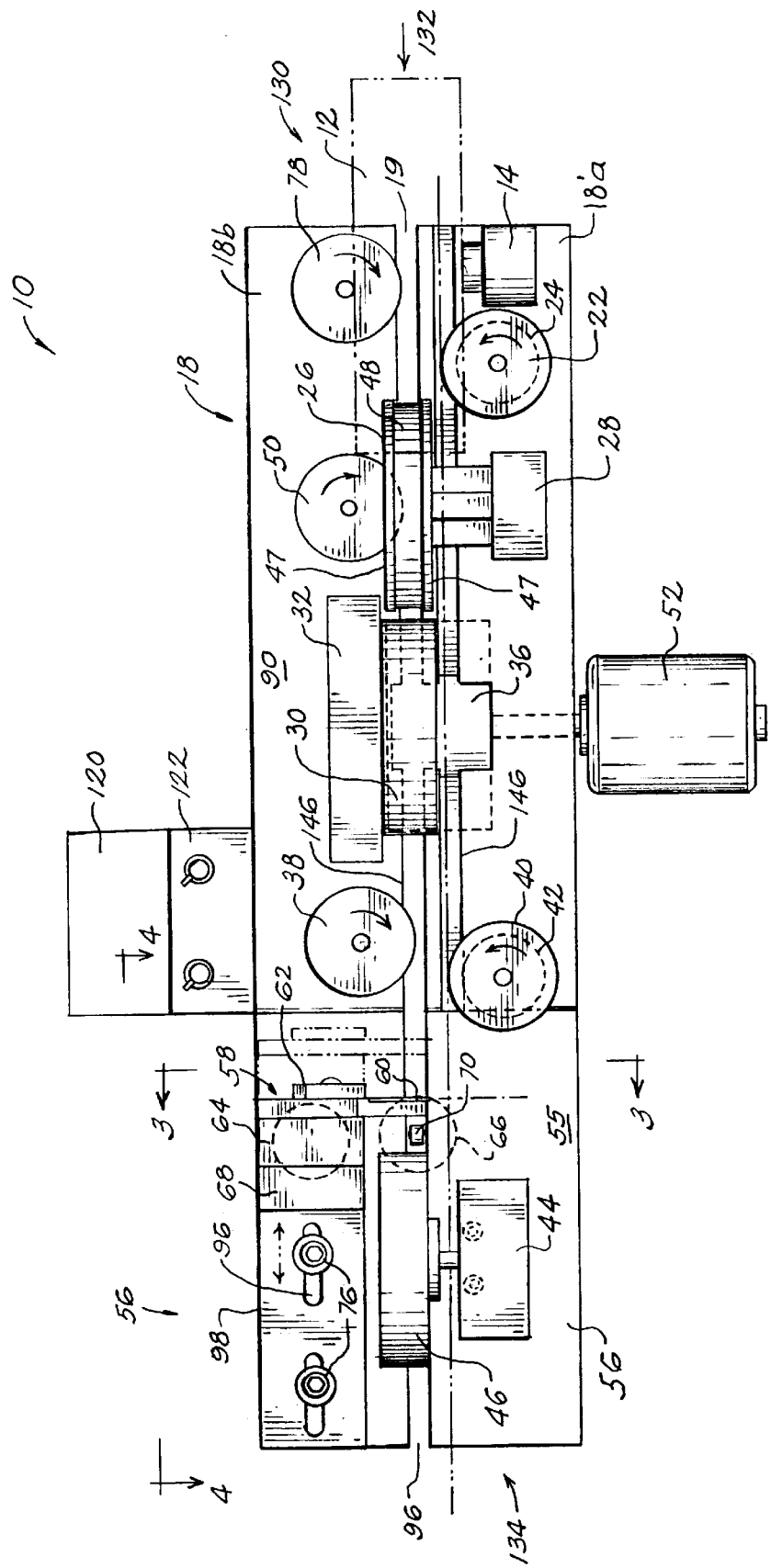
FIG. 2 is a top, plan view of the tape applicator apparatus of FIG. 1.

With reference now to the drawings, and more particularly to FIGS. 1 and 2 thereof, a preferred embodiment of the tape applicator 10 of this invention will be described. Applicator 10 includes a table 11 having first section 18 and second section 56, tape roll 12, tape guide roller 26, drive roller 36, first pressure roller 30, guide rollers 22, 40, 50, 54, 78, tape cutting mechanism 58 and second pressure roller 46. Members 20 are moved in a feed direction 132 through applicator 10.

Table 11 is mounted on frame 13. Table section 18 preferably is comprised of two portions 18a and 18b. Portions 18a and 18b are separated from one another, as shown in FIG. 2, by a slot 19 that extends in the feed direction 132. Portions 18a and 18b can be moved toward and away from one another to adjust the width of slot 19. Table section 18 has an upper surface 90. Table section 56 also is formed of two portions 56a and 56b which are separated by slot 92, and which can be moved toward or away from one another to adjust the width of slot 92. Table section 56 has an upper surface 55. Upper surfaces 55 and 90 are generally planar and are generally parallel to one another. Preferably, grooves 146 are formed in table portions 18a and 18b and 56a and 56b which are sized and positioned to help guide members 20 along table 11 in feed direction 132. Grooves 146 preferably extend along the length of table 11 in feed direction 132 and are positioned symmetrically on either side of slots 19 and 92. Grooves 146 are spaced a distance sufficient to accommodate a member 20 of the desired size so that member 20 sits between the grooves. The spacing between grooves 146 is adjusted by moving portions 18a and 18b, and 56a and 56b respectively, toward and away from one another to adjust the width of respective slots 19 and 92, in a manner known to those skilled in the art.

Roll 12 contains a typical glazing tape 16. Tape 16 is dispensed from tape roll 12 onto members 20, as will be described. Roll 12 rotates freely about an axle 17 which is mounted on supports 14. Tape 16 passes from tape roll 12 beneath roller 26. Roller 26 also is disposed in a freely rotating manner on axle 27. Axle 27 is mounted on supports 28. Roller 26 has spaced, parallel ridges 47 which extend about its outer surface and which define a channel 48 extending about the outer circumference of roller 26. Channel 48 has a width which is sized to accept a tape 16 from roll 12 having a comparable width. Roller 26 guides tape 16 and aligns tape 16 on member 20, as described below.

Drive roller 36 is mounted on support frame 13 for table 11. Drive roller 36 is positively and continuously driven about a central axis of rotation by motor 52, which also is supported by frame 13. Roller 36 is sized and positioned so that it extends upwardly through an opening, which spans at least the width of slot 19 and which may be slightly wider than slot 19, so that an upper surface of roller 36 projects slightly above upper surface 90 of table section 18 to positively engage a frame member disposed on upper surface 90. Roller 36 preferably is formed of a hardened rubber material or the like which will suitably engage a frame member 20. Motor 52 preferably is an electric motor, although a non-electric motor, such as a gasoline motor, could be used. Motor 52 could be a continuously driven motor or a servo-motor.

First pressure roller 30 preferably is disposed immediately above drive roller 36. Roller 30 is freely rotatable about axle 31. Axle 31 of roller 30 is mounted on slide 33 which is slidably disposed on rails or slideways (not shown) on supports 32 for movement in a vertical direction toward and away from table surface 90. Preferably, tongue-in-groove slideways are used for slide 33. Slide 33 and thus roller 30 are urged downwardly against a member 20 on surface 90. Preferably, although not necessarily, roller 30 is disposed directly above drive roller 36 and roller 30 is urged toward drive roller 36 and a member 20 disposed between roller 30 and drive roller 36. Preferably, slide 33 and roller 30 are urged downwardly by a pneumatic cylinder 34 which is coupled to slide 33 by arm 140 and which provides an adjustable and measurable amount of downward pressure on slide 33 and roller 30. However, a biasing spring or other like device may instead be used to provide the desired downward force. Pressure roller 30 applies a predetermined amount of force onto a member 20 to which tape 16 is applied. In this manner, tape 16 is adhesively bonded to a member 20.

A stop 142 is provided to space roller 30 above roller 36 and above table section 18 at all times to prevent roller 30 from engaging roller 36 or table section 18 when no member 20 is present. Stop 142 preferably is adjustable to allow members 20 having different vertical thicknesses to be accommodated. In one embodiment, stop 142 includes a bolt 31 threaded onto the lower end of slide 33. The head of bolt 31 engages surface 90. A lock nut 141 is threadably mounted on bolt 31. By screwing bolt 31 in or out of slide 33 and using nut 141 to lock the position of bolt 31, the spacing between the bottom of slide 33 and surface 90 may be adjusted.

Rollers 22, 78, 54, 50 and 40 all are freely rotatable about a vertical axis of rotation or an axis perpendicular to surface 90. Preferably, none is positively driven, although any one or all of rollers 22, 78, 54, 50 and 40 could be positively driven by a motor or the like, if desired. Rollers 78, 50 and 54 are configured and located to engage one edge of members 20, such as the edge of glazing leg 21, to guide member 20 through applicator 10. Rollers 22 and 40 are configured and located to engage the opposite edge of members 20, such as the side surface of segment 19. These rollers properly guide and align members 20 so that tape 16 is properly aligned on members 20, such as on glazing leg 21, to properly apply tape 16 to a surface of members 20. If tape 16 is being applied to muntin bars, rollers 78, 50, 54, 22 and 40 guide side edges of the muntin bars and tape is applied to an upwardly facing surface of the muntin bars. Rollers 22 and 40 are each slightly raised above upper surface 90 and are disposed on top of corresponding sections 24 and 42 which are reduced in diameter with respect to respective rollers 22 and 40. The reduced diameter of sections 24 and 42 permits applicator 10 to accommodate protrusions or projections which may be present along the lower edge of member 20.

Tape cutting mechanism 58 of this invention will now be described with reference to FIGS. 1–4. Mechanism 58 includes switch 70, support 68, mounting block 64, and blade 60. Table section 56 is disposed immediately after table section 18 when proceeding in feed direction 132, so that members 20 pass directly from table section 18 to table section 56 across the junction between sections 18 and 56. Upper surface 55 of table section 56 is spaced vertically below, or is recessed with respect to, upper surface 90 of table section 18 in a direction generally perpendicular to the feed direction and generally perpendicular to the plane formed by surface 90. Preferably, surface 55 is spaced or recessed about ⅛" below surface 90. This spacing may vary from about ¹⁄₁₆" to several inches, depending upon the length of members 20, the thickness of members 20, the position of switch 70, and the length of switch arm 71. The offset must not be so great that the member 20 on table section 56 is not engaged by the following member 20.

Switch 72 is disposed downstream in feed direction 132 from the junction between upper surfaces 55 and 90, or the junction between sections 18 and 56, and downstream of drive roller 36. Switch 72 includes arm 71 which extends from switch 72 through slot 92. Preferably, a roller 70 is mounted on the upper, distal end of arm 71 and is freely rotatable about an axis generally parallel to surface 55. Arm 71 preferably is moveable in the direction of its elongation, or in a vertical direction, as shown by the arrow in FIG. 1. In its fully extended position, arm 71 is located so that an upper surface of roller 70 extends above upper surface 55. The amount that an upper surface of roller 70 extends above upper surface 55 is variable, depending upon the distance of roller 70 in the feed direction 132 from the junction of upper surfaces 55 and 90, the length of members 20 and the distance upper surface 55 is recessed below upper surface 90. Typically, roller 70 extends above upper surface 55 generally a little less than the distance upper surface 55 is recessed below upper surface 90, so that the upper surface of roller 70 is just below the plane of upper surface 90. In the example given above, the upper surface of roller 70 preferably projects above upper surface 55 about ¹⁄₁₆ inch. When arm 71 and roller 70 are depressed toward switch 72 so that the upper surface of roller 70 is about flush with upper surface 55, switch 72 is triggered. Switch 72 may be any typical, conventional, commercially available switch, such as a snap-action, roller, plunger-activated, two-way switch such as that sold by OMRON under product designation No. ZE-N22-2S.

Support 68 is formed of a lower, horizontal plate 98 disposed generally parallel to surface 55 and a vertical plate 100 disposed generally perpendicular to surface 55. A mounting block 64 is slidably disposed on support 68 for movement toward and away from table surface 55, or in a vertical direction as shown in FIG. 1. Typically, block 64 is mounted on vertical rails or slideways (not shown) on plate 100 so that it may move over a limited distance. A cylinder 66 is affixed to block 64, typically at its lower edge, and is operative to move block 64 toward and away from surface 55. Cylinder 66 may be an electrically actuated solenoid or other like device, but preferably is pneumatically operated.

Immovably affixed to block 64 is a blade mount 74 onto which blade 60 is mounted. Blade 60 has a lower edge 61 which is sharpened, and which is structured to cut tape 16, as shown in FIG. 3. Blade 60 may be any conventional blade which is formed of stainless steel or the like and which is sufficiently sharp and rigid for cutting tape 16. As can be seen in FIG. 3, blade mount 74 includes a notch 75 so that when blade 60 is moved into position to cut tape 16, notch 75 accommodates the shape of a surface of member 20 onto which tape 16 is applied, such as glazing leg 21, so that mount 74 does not engage member 20 or in any other way interfere with the cutting process or the movement of member 20.

Preferably, edge 61 of blade 60 rests on a lower lip 94 on blade mount 74 at points spaced from notch 75. Lip 94 extends approximately to the edge of notch 75 and not beyond. Thus, edge 61 rests on lip 94 at a location spaced from notch 75, but is exposed in the vicinity of notch 75, as shown in FIG. 3. Blade 60 typically is held in place on mount 74 by a holder 62 which preferably is pivotally mounted about a retainer 63, such as a rivet, screw or bolt or the like. Preferably, to replace or remove blade 60, blade holder 62 is pivoted about retainer 63 so that it no longer overlies blade 60. Blade 60 is then slid to the left as shown in FIG. 3, or generally parallel to surface 55 away from support 68 until blade 60 is free of lip 94. Conversely, when installing a new blade 60, blade 60 is slid from the left as shown in FIG. 3 or parallel to surface 55 toward support 68 until blade 60 is in registration with the space provided in mount 74, with edge 61 resting on lip 94. Retaining arm 62 is then pivoted about retainer 63 until arm overlies blade 60.

The position of support 68, and thus the position of blade 60 on table section 56 may be adjusted in a direction parallel to feed direction 132, or in a right-to-left direction as shown in FIGS. 1 and 2. In this manner, blade 60 may be positioned in precisely the location required for cutting the tape at the desired position on each member 20 as it passes through applicator 10. Preferably the position of blade 60 is adjusted so that tape 16 is cut adjacent the trailing end of each member 20 as will be discussed.

In one embodiment, as shown in FIGS. 2 and 4, plate 98 of support 68 includes enlarged slots 96 which are elongated in a direction parallel to feed direction 132, or from left to right as shown in FIGS. 2 and 4. Bolts 76 extend through slots 96 to affix plate 98, and thus support 68 to table section 56. The position of blade 60 with respect to feed direction 132 may be adjusted merely by loosening bolts 76 and sliding support 68 back or forth parallel to feed direction 132 or from left to right or right to left, as shown in FIGS. 2 and 4. Bolts 76 travel in slots 96 during movement of support 68 and are thereafter tightened. The precise desired location of blade 60 may be determined empirically depending upon the length of members 20, the speed at which members 20 move, the spacing of roller 70 from the junction of surfaces 55 and 90, and the distance roller 70 projects above surface 55.

Disposed downstream from blade 60 on table section 56 in feed direction 132, or to the left of blade 60, as shown in FIGS. 1 and 2, is second pressure roller 46. Pressure roller 46 is freely rotatably mounted about axle 45, which is typically aligned parallel to surface 55. Axle 45 is mounted on slide block 102 which is slidably mounted within support 44 on rails or slideways or the like (not shown). Slide block 102, and thus pressure roller 46 are urged downwardly toward surface 55 by a biasing element such as extension springs 104 or the like which are mounted on support 44 and are affixed to slide block 102. A pneumatic cylinder or electric solenoid may also be used instead of springs 104. In this way, pressure roller 46 is urged against a member 20 passing therebeneath to push member 20 against upper surface 55. Roller 46 is formed of hard rubber or some other like material which grips member 20 sufficiently to produce rotation of roller 46 as member 20 passes beneath it.

The operation of applicator 10 is controlled by controller 120 which may be a programmable microprocessor, or a hardwired controller, which is well known to those skilled in the art and which is programmed to produced the desired functions. Controller 120 includes a timer circuit or the like which is responsive to signals received from switch 72. Controller 120 controls operation of cylinder 66 and cylinder 34. Controller 120 also includes a control panel 122 for operation and control of applicator 10.

The method of operation of applicator 10 will now be described with particular reference to FIGS. 1, 2 and 3. A member 20 is introduced to table section 18 of applicator 10 at feed end 130 and is advanced in feed direction 132 as shown by the arrow in FIG. 1. Member 20 may be introduced manually or automatically, as desired. With reference to FIG. 2, for a sash member, segment 19 is engaged by rollers 22 and 40, while glazing leg 21 is engaged by rollers 78, 50 and 54, all of which are free-wheeling, and all of which simply guide member 20 through applicator 10. For a muntin bar, rollers 22, 40, 78, 50 and 54 all guide and engage opposed side edges of the muntin bar. Tape 16 from tape roll 12 is dispensed so that it passes beneath roller 26 and roller 30. Channel 48 of roller 26 guides and aligns tape 16 so that tape 16 is aligned with the upper surface of glazing leg 21 of a sash member or an upper surface of a muntin bar, and so that layer 154 of a pressure sensitive adhesive is positioned facing the upper surface of glazing leg 21 or the upper surface of a muntin bar, while release liner 156 is exposed and faces upwardly. Preferably, roller 26 is spaced above member 20 so that member 20 passes beneath roller 26 without being engaged by roller 26.

As member 20 passes beneath pressure roller 30, pressure applied by roller 30 urges layer 154 of tape 16 into an adhesively bonding relationship with the upper surface of glazing leg 21 (or the upper surface of the muntin bar) so that tape 16 is tightly bonded thereto. The pressure applied by cylinder 34 may be adjusted in a manner known to those skilled in the art, such as by adjusting the air pressure, to provide the desired amount of pressure on tape 16. Roller 30 also urges member 20 against drive roller 36, the top surface of which extends slightly above upper surface 90. Drive roller 36 is thereby in firm gripping relationship with the lower surface of member 20 so that as drive roller 36 rotates, it propels member 20 through applicator 10 at a desired speed, and rotates roller 30 about axle 31. Typically, drive roller 36 rotates at a speed sufficient to propel member 20 through applicator 10 at a speed of about 120 feet per minute. However, other feed speeds may be used as desired.

As member 20 moves in feed direction 132, and as tape 16 is adhered thereto, additional tape 16 is pulled from roll 12 which freely rotates in response to dispense the additional tape. As one member 20 passes through applicator 10, the next member 20 is manually or otherwise fed into apparatus 10 at the feed end 130 so that the forward end of the next member 20 is in abutting relationship with the trailing end of the one member 20. As the next member 20 passes drive roller 36, the next member 20 pushes the one member 20 ahead of it in feed direction 132 and so forth. In this manner, drive roller 36 is able to move an entire sequence of members 20 through applicator 10 for application of tape 16 thereto.

As each member 20 passes rollers 40 and 54, the forward end thereof in feed direction 132 passes over the junction between upper surface 55 and upper surface 90. Initially, member 20 is parallel to surfaces 55 and 90 and is held in that orientation by first pressure roller 30. The forward end that frame member 20 is spaced above surface 55 the same distance as upper surface 90 is spaced above surface 55, or about ⅛" in a preferred example. However, as the forward end of that member 20 passes beneath second pressure roller 46 and as the trailing end of that member 20 leaves first pressure roller 30, the forward end of that member 20 is pushed downwardly against upper surface 55 by roller 46. At this point, member 20 is disposed at a slight angle with respect to surfaces 55 and 90, tilting downwardly toward upper surface 55, and roller 70 on arm 71 is not yet engaged by that member 20. As the trailing end of that member 20 passes over the junction between surfaces 55 and 90, the trailing end drops onto upper surface 55 so that member 20 is now oriented generally parallel to surface 55. At this point, roller 70 is engaged by that member 20, depressing arm 71 and triggering switch 72. Roller 70 rotates to accommodate any movement of member 20 in feed direction 132.

Once switch 72 has been triggered or actuated, a signal is sent to controller 120. Controller 120 then momentarily stops movement of members 20 through applicator 10. This cessation of movement can be accomplished in many ways, such as by stopping motor 52 and thus drive roller 36, or by retracting drive roller 36 and motor 52 away from upper surface 90 and out of engagement with a lower surface of a member 20. In the preferred method of this invention, movement of members 20 is stopped by raising pressure roller 30 out of engagement with a member 20. Controller 120 sends a signal to cylinder 34 which, in response, raises slide 33, lifting roller 30 out of engagement with a member 20, thus preventing roller 36 from advancing members 20. The period during which advancement of members 20 is stopped typically is about one half second. Upon cessation of movement of members 20, that member 20 disposed on upper surface 55 is positioned so that the trailing end is spaced upstream in the feed direction from blade 60. After receipt of the signal from switch 72, controller 120 also sends a signal to cylinder 66 causing cylinder 66 to pull block 64 and thus blade 60 downwardly toward surface 55 so that blade 60 engages tape 16 on the upper surface of member 20, such as on glazing leg 21, at a point spaced downstream from the trailing end of that member 20. Blade 60 cuts through the release liner 156, adhesive layer 152 and carrier 150. Blade 60 may or may not entirely cut through adhesive layer 154 bonding tape 16 to the upper surface of member 20. Typically, tape 16 is cut a distance of about 1½ inches downstream of the trailing end of member 20. However, a greater or lesser distance may also be acceptable. The location where the cut is performed may be set by adjusting the position of support 68 on upper surface 55, with respect to feed direction 132 as described, by loosening bolts 76 and moving plate 98 with respect to bolts 76.

The activation of switch 72 also sets a timer circuit in controller 120. After a predetermined period of time, controller 120 sends signals to cause cylinder 66 to retract blade 60 to a position spaced above member 20, and to cause cylinder 34 to again push roller 30 against a member 20 to urge member 20 into engagement with roller 36 to again advance members 20 through applicator 10. That member 20 on surface 55 whose tape was cut then is ejected from table section 56 at discharge end 134 by being pushed by the next successive member 20. As the trailing edge of that member 20 on surface 55 passes over roller 70, arm 71 pushes roller 70 upwardly above surface 55 in readiness for the next member 20. The timer resets, and the process is repeated for the next member 20 in succession.

If blade 60 does not cut entirely through adhesive layer 154 of tape 16, as a member 20 is ejected from discharge end 134, the tape on the trailing end of the member 20 will be torn free from the forward end of the next successive member 20. The end of tape 16 will be spaced from the trailing end of each member 20 a specified distance, for example, about 1½ inches. The forward end of each member 20 also will have a tape tab extending beyond the forward end about the same distance, for example about 1½ inches. Ultimately, the members 20 will be cut to size and the forward tab will be removed, as well as any space between the trailing end of the member 20 and the end of tape 16.

Applicator 10 of this invention reduces the labor and time required to apply tape to a frame or sash member or a muntin bar prior to assembly of a door, window or skylight, or prior to affixation of a muntin to glazing, and significantly improves the accuracy with which the tape is applied to a member. In addition, the same applicator can be used to apply tape to any size member typically used for such glazing applications.

In view of the above description, it is likely that modifications and improvements will occur to those skilled in the art which are within the scope of this invention. The above description is intended to be exemplary only, the scope of the invention being defined by the following claims and their equivalents.

What is claimed is:

1. Apparatus for applying tape having an adhesive layer to a plurality of members in sequence, said apparatus comprising:

a feed mechanism for moving the members sequentially to and through said apparatus in a feed direction;

apparatus for dispensing the tape onto the members;

apparatus for urging the tape against each member as that member is advanced in the feed direction, said apparatus for urging the tape comprising:
   a roller rotatable about a central axis;
   slideways disposed substantially perpendicular to said feed direction; and
   a slide movable along said slideways toward and away from the members, said roller being mounted on said slide;

guide mechanisms for guiding each member to and through the apparatus whereby the tape is applied only to a desired surface of each member; and a cutter mechanism for cutting the tape adjacent a trailing edge of each member after application of the tape thereto, said cutter mechanism comprising:
   a switch actuable by a member being advanced in the feed direction;
   a cutting blade slidably mounted for movement in a direction toward and away from the member;
   an actuator for advancing said blade toward the member in response to actuation of said switch by the member; and
   an arm operatively connected to said switch for activation of said switch, said arm extending through an opening in an upper surface of a table upon which the member resides, said arm being engageable by the member moving in said feed direction;
   wherein the upper surface of the table includes a first portion adjacent said feed mechanism and a second portion adjacent said switch arm, and wherein said second portion of the upper surface of the table is recessed below the first portion of the upper surface of the table, whereby a member passing from the first portion to the second portion of the upper surface of the table is spaced above a distal end of said switch arm until a trailing end of that member passes from the first portion to the second portion of the upper surface of the table.

2. The apparatus as recited in claim 1 wherein said apparatus for urging the tape against each member further comprises a guide for guiding tape from said apparatus for dispensing to said roller.

3. The apparatus as recited in claim 2 wherein said guide comprises:
- a guide roller rotatable about a central axis and having an outer perimeter; and
- a guide channel disposed about the outer perimeter of said guide roller.

4. The apparatus as recited in claim 1 wherein said apparatus for urging the tape against each member further comprises apparatus for applying a controlled pressure on said slide directed toward the member.

5. The apparatus as recited in claim 4 wherein said apparatus for applying a controlled pressure is a pneumatic cylinder.

6. The apparatus as recited in claim 1 wherein said feed mechanism comprises:
- a drive roller having a central axis and an outer perimeter positioned to engage a member; and
- a motor operatively coupled to said drive roller for rotating said drive roller about the central axis.

7. The apparatus as recited in claim 6 wherein said apparatus for urging urges members against said drive roller.

8. The apparatus as recited in claim 1 wherein said guide mechanisms comprise at least one roller freely rotatable about an axis generally perpendicular to the feed direction, said at least one roller having an outer perimeter positioned to sequentially engage each member.

9. The apparatus as recited in claim 1 wherein said cutter mechanism further comprises apparatus spaced downstream from said blade in said feed direction for urging the member against the upper surface of the table.

10. The apparatus as recited in claim 1 wherein a location of said cutting blade is adjustable with respect to said switch in a direction parallel to said feed direction.

11. The apparatus as recited in claim 1 wherein said cutting blade is replaceable.

12. The apparatus as recited in claim 1 wherein said actuator comprises a pneumatic cylinder.

13. The apparatus as recited in claim 1 wherein said switch arm includes a roller disposed on the distal end.

14. Apparatus for applying tape having an adhesive layer to a plurality of members in sequence, said apparatus comprising:
- a feed mechanism for moving the members sequentially to and through said apparatus in a feed direction;
- apparatus for dispensing the tape onto the members;
- apparatus for urging the tape against each member as that member is advanced in the feed direction;
- guide mechanisms for guiding each member to and through the apparatus whereby the tape is applied only to a desired surface of each member; and
- a cutter mechanism for cutting the tape adjacent a trailing edge of each member after application of the tape thereto, said cutter mechanism comprising:
  - a cutting blade slidably mounted for movement in a direction toward and away from a member;
  - a switch;
  - an arm operatively connected to said switch for activation of said switch, said arm extending through an opening in an upper surface of a table upon which the member resides, a distal end of said arm being engagable by the member moving in said feed direction; and
- an actuator for advancing said blade toward the member in response to activation of said switch;
- said upper surface of said table including a first portion adjacent said feed mechanisms, and a second portion adjacent said switch arm, said second portion of said upper surface of said table being recessed below said first portion of said upper surface of said table, whereby a member passing from said first portion to said second portion of said upper surface of said table is spaced above said distal end of said switch arm until a trailing end of a member passes from said first portion to said second portion of said upper surface of said table.

* * * * *